United States Patent
Mohamadi (10) Patent No.: US 9,110,168 B2
(45) Date of Patent: Aug. 18, 2015

(54) SOFTWARE-DEFINED MULTI-MODE ULTRA-WIDEBAND RADAR FOR AUTONOMOUS VERTICAL TAKE-OFF AND LANDING OF SMALL UNMANNED AERIAL SYSTEMS

(71) Applicant: Farrokh Mohamadi, Irvine, CA (US)

(72) Inventor: Farrokh Mohamadi, Irvine, CA (US)

(73) Assignee: Farrokh Mohamadi, Irvine, CA (US)

( * ) Notice: Subject to any disclaimer, the term of this patent is extended or adjusted under 35 U.S.C. 154(b) by 181 days.

(21) Appl. No.: 13/678,835

(22) Filed: Nov. 16, 2012

(65) Prior Publication Data

US 2014/0222246 A1  Aug. 7, 2014

Related U.S. Application Data

(60) Provisional application No. 61/561,623, filed on Nov. 18, 2011.

(51) Int. Cl.
| | |
|---|---|
| G01S 15/00 | (2006.01) |
| G01S 13/00 | (2006.01) |
| G01S 7/02 | (2006.01) |
| G01S 13/91 | (2006.01) |
| G01S 7/28 | (2006.01) |
| G01S 13/02 | (2006.01) |
| G01S 13/88 | (2006.01) |

(52) U.S. Cl.
CPC ............... G01S 13/913 (2013.01); G01S 7/28 (2013.01); G01S 13/0209 (2013.01); G01S 13/885 (2013.01)

(58) Field of Classification Search
CPC ............................ F41H 11/136; G01S 13/0209
See application file for complete search history.

(56) References Cited

U.S. PATENT DOCUMENTS

| | | | | |
|---|---|---|---|---|
| 4,965,582 | A * | 10/1990 | Hellsten | 342/25 A |
| 5,487,172 | A * | 1/1996 | Hyatt | 712/32 |
| 5,593,114 | A * | 1/1997 | Ruhl | 244/183 |
| 6,112,141 | A * | 8/2000 | Briffe et al. | 701/14 |
| 6,384,766 | B1 * | 5/2002 | Ulander | 342/25 R |
| 6,567,044 | B2 * | 5/2003 | Carroll | 342/357.34 |
| 6,653,970 | B1 * | 11/2003 | Mitra | 342/22 |
| 6,727,841 | B1 * | 4/2004 | Mitra | 342/25 R |
| 6,867,727 | B1 * | 3/2005 | Mitra | 342/59 |
| 7,312,763 | B2 | 12/2007 | Mohamadi | |
| 7,504,984 | B1 * | 3/2009 | Mitra | 342/22 |
| 7,511,654 | B1 * | 3/2009 | Goldman et al. | 342/22 |
| 7,548,205 | B2 | 6/2009 | Mohamadi | |

(Continued)

OTHER PUBLICATIONS

Douglas Murphy and James Cycon, "Applications for Mini VTOL UAV for Law Enforcement," Space and Naval Warfare Systems Center San Diego, CA 92152-7383, Nov. 1998.*

(Continued)

*Primary Examiner* — Rami Khatib
*Assistant Examiner* — Navid Ziaeianmehdizadeh
(74) *Attorney, Agent, or Firm* — Haynes and Boone, LLP (57) ABSTRACT

A small unmanned aerial system (sUAS) is used for aerial and on the ground surveillance while an operator of the sUAS, or other personnel, remain at a safe distance. The sUAS system can perform an autonomous landing and can be operated at an extended, e.g., greater than 100 meters, standoff from the detection apparatus and potential harm. The sUAS may be implemented as an easy-to-operate, small vertical take-off and landing (VTOL) aircraft with a set of optical, thermal, and chemical detection modules for performing aerial surveillance and ground surveillance after landing.

14 Claims, 11 Drawing Sheets

(56) References Cited

U.S. PATENT DOCUMENTS

| | | | |
|---|---|---|---|
| 7,720,630 B1* | 5/2010 | Miller et al. | 702/150 |
| 7,741,990 B2* | 6/2010 | Aprile | 342/25 B |
| 7,830,989 B2 | 11/2010 | Mohamadi | |
| 7,884,757 B2 | 2/2011 | Mohamadi et al. | |
| 7,965,223 B1* | 6/2011 | McCusker | 342/29 |
| 8,237,604 B2 | 8/2012 | Mohamadi et al. | |
| 8,744,760 B1* | 6/2014 | Mishmash et al. | 701/454 |
| 2004/0075018 A1* | 4/2004 | Yamane | 244/17.13 |
| 2007/0252748 A1* | 11/2007 | Rees et al. | 342/29 |
| 2008/0055149 A1* | 3/2008 | Rees et al. | 342/29 |
| 2008/0169962 A1* | 7/2008 | Rees et al. | 342/29 |
| 2008/0191924 A1* | 8/2008 | Duff et al. | 342/14 |
| 2009/0051581 A1* | 2/2009 | Hatono | 342/33 |
| 2009/0055038 A1* | 2/2009 | Garrec et al. | 701/17 |
| 2009/0243855 A1* | 10/2009 | Prokopuk | 340/572.1 |
| 2010/0193644 A1* | 8/2010 | Karem | 244/7 R |
| 2010/0225541 A1* | 9/2010 | Hertzog et al. | 342/387 |
| 2011/0015810 A1* | 1/2011 | Lee | 701/16 |
| 2011/0169686 A1* | 7/2011 | Eusebi Borzelli et al. | 342/25 A |
| 2011/0210883 A1* | 9/2011 | Mohamadi | 342/21 |
| 2011/0273324 A1* | 11/2011 | Petillon | 342/118 |
| 2011/0285981 A1* | 11/2011 | Justice et al. | 356/4.01 |
| 2012/0056040 A1* | 3/2012 | Brotherton-Ratcliffe et al. | 244/23 A |
| 2012/0105274 A1* | 5/2012 | Andersson et al. | 342/25 A |
| 2012/0112957 A1* | 5/2012 | Nguyen et al. | 342/25 A |
| 2012/0177027 A1* | 7/2012 | Venkatraman et al. | 370/350 |
| 2012/0215388 A1* | 8/2012 | Pepitone et al. | 701/14 |
| 2012/0234968 A1* | 9/2012 | Smith | 244/12.3 |
| 2012/0261516 A1* | 10/2012 | Gilliland et al. | 244/183 |
| 2013/0248656 A1* | 9/2013 | Mohamadi | 244/190 |
| 2014/0032034 A1* | 1/2014 | Raptopoulos et al. | 701/25 |
| 2014/0062754 A1* | 3/2014 | Mohamadi | 342/22 |
| 2014/0062758 A1* | 3/2014 | Mohamadi | 342/53 |
| 2014/0125511 A1* | 5/2014 | Longstaff | 342/33 |
| 2014/0168010 A1* | 6/2014 | Mohamadi | 342/357.39 |

OTHER PUBLICATIONS

Fred Mohamadi, "Wafer-scale integration brings low cost and a small footprint to active antenna arrays," Microwave/Millimeter Wave Technology, www.rfdesign.com, Feb. 2005.*

* cited by examiner

SOFTWARE-DEFINED MULTI-MODE ULTRA-WIDEBAND RADAR FOR AUTONOMOUS VERTICAL TAKE-OFF AND LANDING OF SMALL UNMANNED AERIAL SYSTEMS

CROSS REFERENCE TO RELATED APPLICATIONS

This application claims the benefit of priority from U.S. Provisional Patent Application No. 61/561,623, filed Nov. 18, 2011, which is incorporated by reference.

BACKGROUND

Embodiments of the present invention generally relate to unmanned aerial surveillance and, more particularly, to a small unmanned aerial system (sUAS) using a combination of radio, optical, thermal, and chemical detection for autonomously making a landing and performing surveillance.

There is often a need for remote surveillance using small unmanned aircraft so as not to put personnel in harm's way. Such needs often arise in situations where surveillance or security protection is desired such as for police work, military combat scenarios, or fire and rescue situations.

It may be desirable, for example, to be able to detect covert activity—such as smuggling or terrorist operations—or concealed dangers such as weapons or bombs hidden behind a wall of a building or buried underground. Solutions to such problems may be useful in situations where surveillance of an inhabitable area from behind a building wall may be desired, for example, for detecting illegal activities such as smuggling or illegal border crossings or, for example, detecting the presence of hostile individuals in a war zone or terrorist situation. Another important application is detection of unexploded ordnance (UXO) such as abandoned landmines or undetonated bombs that may, for example, be left over from past conflicts. In urban environments, unexploded ordnance often may lie concealed behind standing walls.

Many situations where surveillance is desired, however, can expose the operator of surveillance equipment to grave danger and unacceptably high risks. Using equipment for surveillance may also expose the equipment itself to destruction and loss.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

Broadly speaking, methods and systems are provided in one or more embodiments for remotely and autonomously landing an unmanned surveillance aircraft while an operator of the surveillance aircraft, or other personnel, remain at a safe distance from the suspect area.

Many sonic based systems have been deployed to detect distance of objects to a moving unmanned vehicle, however, use of such systems typically are limited for landing small unmanned aerial vehicles due to the low signal to noise ratio as a result of lack of proper resolution, for example, as well as a number of other factors including multi-path echoes and propeller noise. Optical and thermal imaging has also been used to find a clear platform for landing; the image processing required for autonomous landing, however, is very complex in the presence of heat sources, fog, or smog, and especially during brownout effects on land or water spray when landing over sea based platforms. One or more embodiments solve these problems using an ultra wideband (impulse) radar system as an alternative to address the deficiencies of other systems.

In one or more embodiments, a remotely controlled small unmanned aerial system (sUAS)—with vertical take-off and landing (VTOL) capability and capability to hover at a near standstill and with the capability for autonomous landing and take-off—may provide additional surveillance and mission capabilities such as capability for IED or UXO detection and neutralization while being operated at an extended, e.g., greater than 100 meters (m), standoff (distance of a human operator from the detection apparatus and potential harm); endowment with a set of optical, thermal, and chemical detection modules for aerial surveillance. One or more embodiments may provide methods and systems for unmanned aerial surveillance using a combination of radio, optical, thermal, and chemical detection using a small unmanned aerial system (sUAS) and additionally provide for confirming the existence of explosives and accomplishing their detonation from a safe distance. For example, in one embodiment a system may include: an aircraft having a plurality of wing unit propellers for vertical takeoff and landing; a control system included in the aircraft for controlling flight of the aircraft from a remote location; an ultra-wideband (UWB) radar imaging system carried by the aircraft, for multiple types of surveillance including detection of motion and presence of animal or human life in a compound or container, detection of concealed objects; and a telemetry system carried by the aircraft for providing information from the UWB radar imaging system to the remote location.

Figure 1:
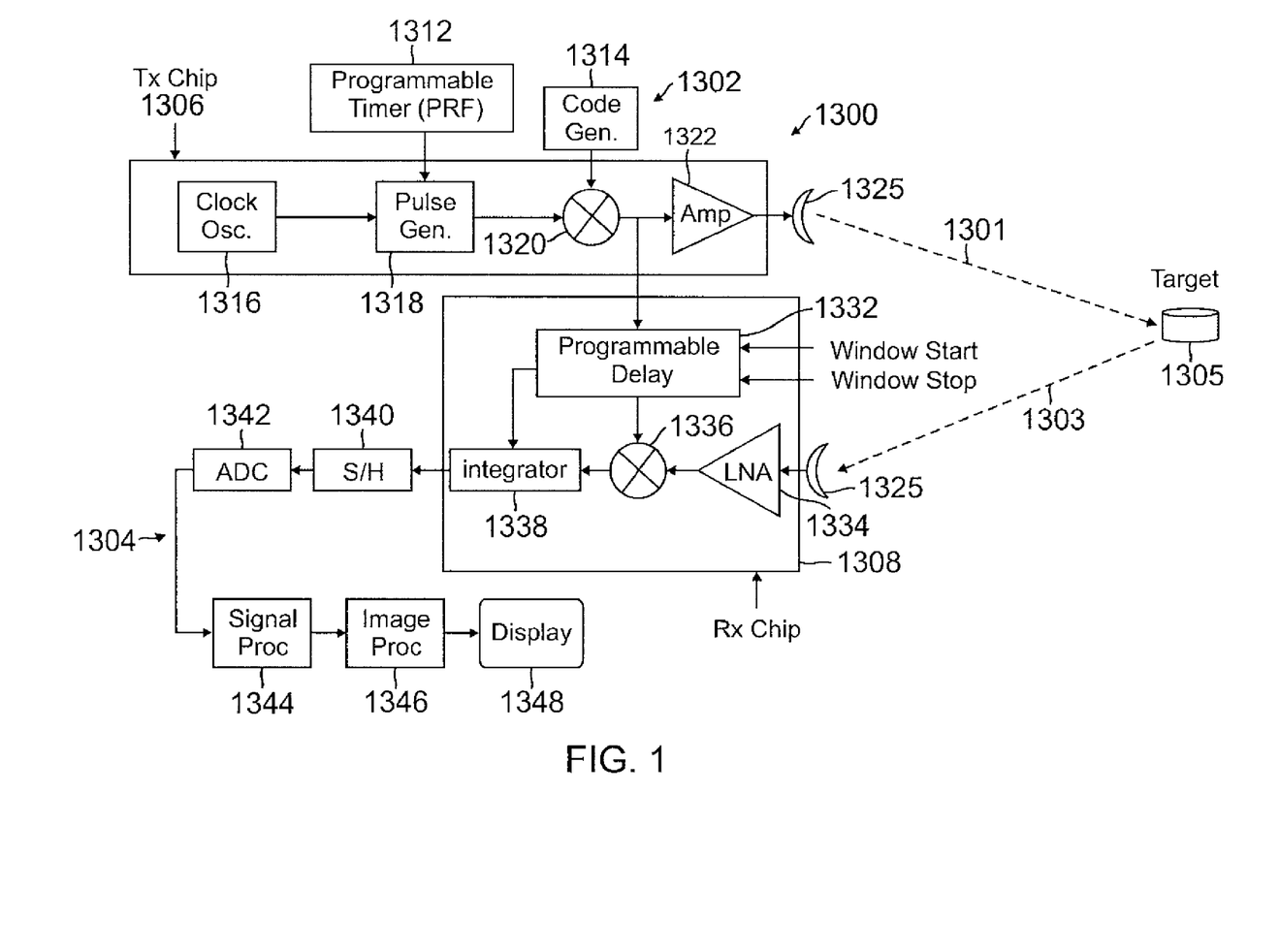
FIG. 1 is a system block diagram illustrating a radar sensor in accordance with an embodiment of the present invention.

FIG. 1 illustrates a radar sensor 1300 in accordance with an embodiment of the present invention. Radar sensor 1300 may include an impulse radar transmitter 1302 that transmits narrow radio frequency (RF) pulses at a certain pulse repetition frequency (PRF). For example, the transmitter of radar sensor 1300 may emit RF radiation 1301 in the form of rapid wideband (narrow width) radar pulses at a chosen pulse repetition frequency (PRF) in the 1-10 GHz band. The pulses can penetrate, for example, soil, glass, wood, concrete, dry wall, and bricks with varying attenuation constant. By choosing a PRF in the range of 10-100 MHz, for example, and appropriate average transmitter power, a surveillance range of approximately 5-50 feet can generally be achieved. The radar system 1300 may, for example, transmit Gaussian pulses as short as 100 pico-seconds wide with center frequency in the 1-10 GHz band. Transmitter 1302 may employ a wafer scale antenna and wafer scale beam forming as disclosed in U.S. Pat. No. 7,312,763, issued Dec. 25, 2007, to Mohamadi and U.S. Pat. No. 7,548,205, issued Jun. 16, 2009, to Mohamadi and virtual beam forming as disclosed in U.S. Pat. No. 8,237,604, issued Aug. 7, 2012, to Mohamadi et al., all of which are incorporated by reference.

Radar sensor 1300 may include a radar receiver 1304 that performs the required signal processing on a reflected response (e.g., reflected pulses 1303) to construct a digitized representation of the target 1305 (e.g., a buried IED). In the receiver 1304, amplitude and delay information may be extracted and digitally processed. As shown in FIG. 1, many of the transmitter 1302 functions may be implemented on a transmitter chip 1306 and many of the receiver 1304 functions may be implemented on a receiver chip 1308.

A general block diagram of transmit and receive functions are depicted in FIG. 1. As shown in FIG. 1, radar sensor 1300 may include modules for performing the functions, including: programmable timer 1312 for establishing the PRF; code generator 1314 for providing modulations to the signal 1301; clock oscillator 1316 for providing the RF carrier frequency signal; pulse generator 1318 for forming (or generating) narrow radar pulses based on timing from programmable timer 1312; multiplier 1320 for combining the generated radar pulses with the output of code generator 1314; power amplifier 1322 for amplifying the pulse signal and feeding it to antenna 1325, which may a wafer scale, beam forming antenna as described above. Although two antennas 1325 are shown in FIG. 1 for clarity of illustration, use of a circulator (not shown) as an isolator switch may enable use of a single antenna 1325 for both transmit and receive. Antenna 1325 may include an active array antenna implemented using wafer scale antenna module technology. Wafer scale antenna modules (WSAM) are disclosed by U.S. Pat. No. 7,884,757, issued Feb. 8, 2011, to Mohamadi et al. and U.S. Pat. No. 7,830,989, issued Nov. 9, 2010 to Mohamadi, both of which are incorporated by reference.

Radar sensor 1300, as shown in FIG. 1, may further include modules for performing functions, including: programmable delay timer 1332, coordinated with the transmitted signal 1301, as indicated by the arrow between transmitter chip 1306 and receiver chip 1308, for providing timing, e.g., window start and window stop, for receiving reflected pulses 1303; a low noise amplifier 1334 for receiving the reflected pulses 1303; multiplier 1336 for combining the received reflected pulses 1303 and the window delay from programmable delay timer 1332; integrator 1338; sample and hold 1340, analog to digital converter 1342; signal processor 1344 (e.g., a digital signal processor or DSP); image processor 1346; and display 1348. Display 1348 may be as shown for example in FIG. 7B or FIG. 10.

Figures 2A, 2B:
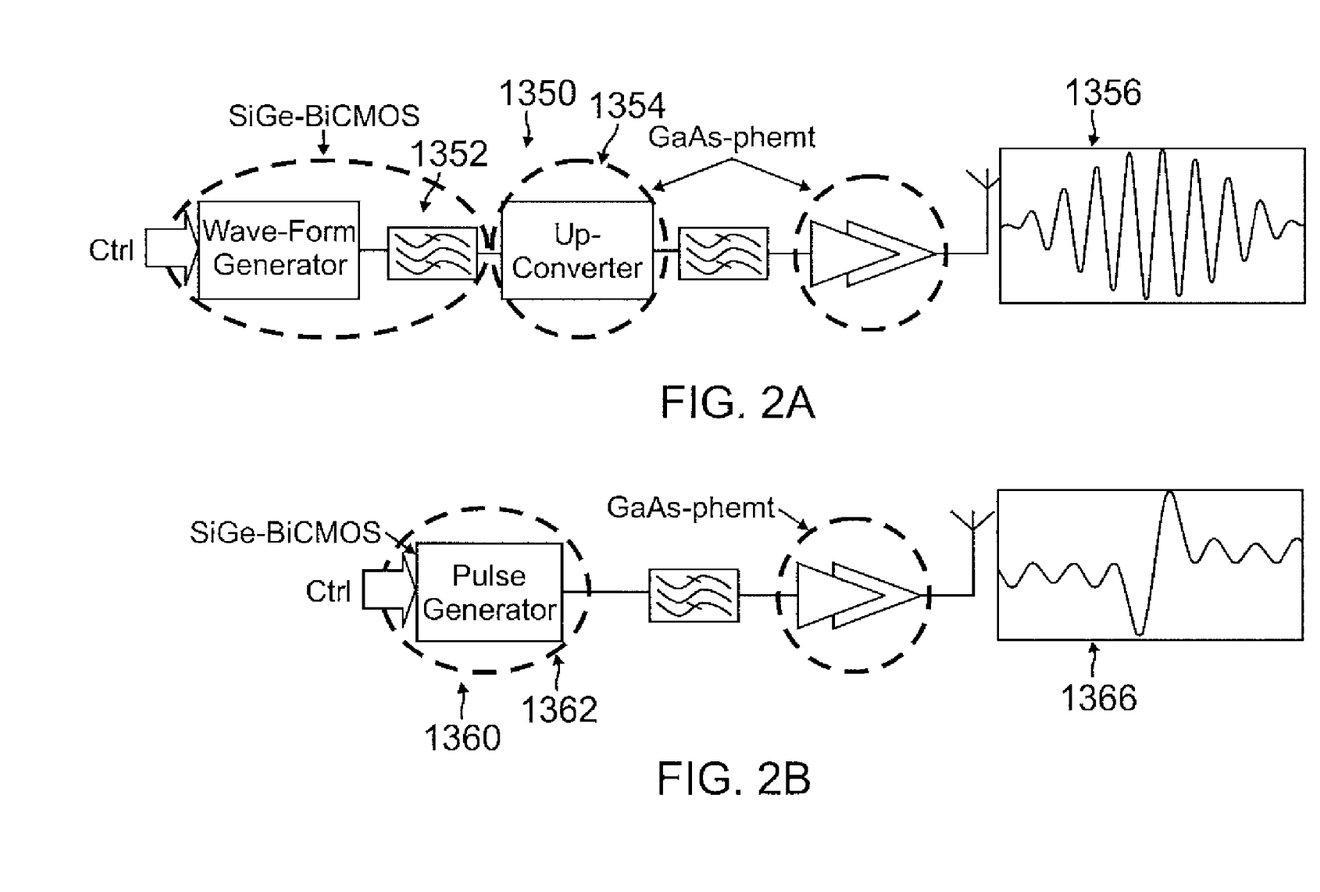
FIGS. 2A and 2B are system block diagrams illustrating alternative implementations of radar transmitters for the sensor of FIG. 1, in accordance with one or more embodiments.

FIGS. 2A and 2B illustrate alternative implementations of radar transmitters (e.g., radar transmitter 1302) for radar sensor 1300 of FIG. 1, in accordance with one or more embodiments. In one implementation strategy, shown in FIG. 2A, the pulse shaping 1352 is performed in the intermediate frequency (IF) bands, and the resulting pulse is up-converted 1354 to RF frequencies resulting in a "carrier-inclusive" UWB-pulse or burst 1356. This strategy may provide versatility in defining carrier frequency for transmission with more flexibility in wave-pulse form definition.

In another implementation strategy, shown in FIG. 2B, the pulse generation 1362 is performed in the RF bands resulting in a "carrier-less" UWB-pulse 1366. This strategy may use less complex circuitry and may have lower power dissipation.

As indicated in FIGS. 2A and 2B, either implementation may employ indium phosphid high electron mobility transistor (HEMT), silicon complementary metal oxide semiconductor (CMOS) or silicon-germanium (SiGe) bipolar-complementary metal oxide semiconductor (BiCMOS) technologies. Also as indicated in FIGS. 2A and 2B, the up-converter and power amplifier stages of either implementation may employ gallium-arsenide (GaAs) pseudomorphic high electron mobility transistor (pHEMT) technologies.

Figure 3:
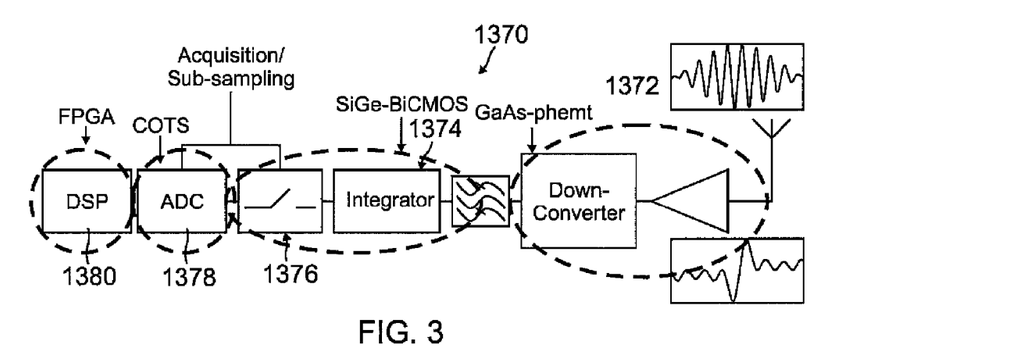
FIG. 3 is a system block diagram illustrating a radar receiver for the sensor of FIG. 1, in accordance with an embodiment.

FIG. 3 illustrates a radar receiver front-end 1370 for the radar sensor 1300 of FIG. 1, in accordance with an embodiment. Either type (as shown in FIG. 2A or 2B) of the transmitted pulse 1356 or 1366 may be received by the radar receiver front-end 1370. The amplified (and down-converted 1372) received signal is integrated 1374 to increase the signal to noise ratio (SNR). A sub-sampling track and hold circuit 1376 is used to create the "base-band" or "low-IF" signal. An analog to digital convertor (ADC) 1378 creates the digital representation of the base-band signal and forwards the data streams to digital signal processing (DSP). Due to the wideband character of the analog RF signals, the filters as well as the custom made high frequency circuits of the receiver may be designed with constant group-delay.

As indicated in FIG. 3, the ADC 1378 may be implemented from commercially available components, also referred to as commercial-off-the-shelf (COTS) and the DSP 1380 may be implemented using field programmable gate array (FPGA) technology. As indicated in FIG. 3, implementation of radar receiver front-end 1370 may also employ, as with the implementation of the radar sensor 1300 transmitter, silicon-germanium SiGe BiCMOS technologies and GaAs pHEMT technologies.

Figure 4:
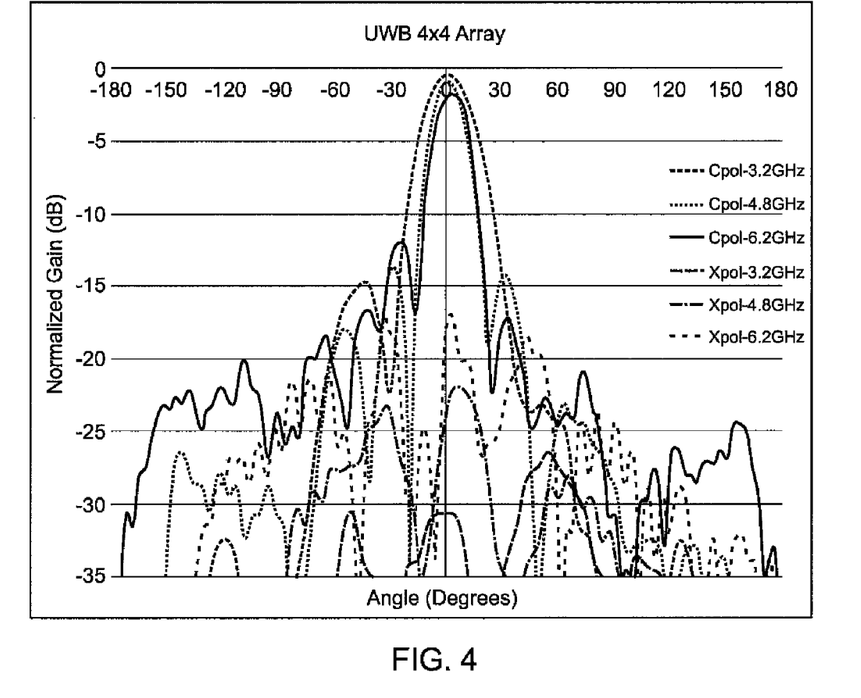
FIG. 4 is a graph illustrating a field pattern and beam width characteristics for an antenna array for the sensor of FIG. 1, in accordance with an embodiment.

FIG. 4 illustrates a field pattern and beam width characteristics for an antenna array for the radar sensor 1300 of FIGS. 1-3, in accordance with an embodiment. FIG. 4 demonstrates, for example, a field pattern and beam width characteristics of a 4×4 antenna array used in a UWB radar for radar sensor 1300. The beam width of the transmitter/receiver (Tx/Rx) is shown in FIG. 4 to be about 30 degrees at 3.2 GHz and 22 degrees at 6.2 GHz with a 2 dB loss compared to the 3.2 GHz beam. There is no cross polarization from the array illustrated by FIG. 4.

Equation 1 describes the relationship between the transmitter power of sensor 1300, target distance, target cross section, and receiver sensitivity of sensor 1300. To calculate the reflected signal strength, it has been assumed that the effective reflective signal from ground is due to the effective cross section of the antenna beam at that elevation.

Equation (1):

$$SNR = \frac{E_S}{E_N} = \frac{P_S \tau_p}{kT_0 F_n} = \frac{P_T G_T G_R \lambda^2 \sigma}{(4\pi)^3 R^4 kT_0 F_n L} \tau_p \text{ joule/joule} \quad (1)$$

$$\text{or } \frac{w-s}{w-s} \text{ or } w/w$$

where:
$P_T$=Transmit Power
$G_T$=Tx Antenna Gain
$G_R$=Rx Antenna Gain
$\lambda$=Wavelength
$\sigma$=Effective Cross Section
$\tau_p$=Period
B=Bandwidth
R=Antenna Distance to Target
$kT_G$=Noise Power
$F_n$=Noise Factor
L=Radar Loss
$f_c$=Frequency And, Equation (2):

$$\lambda = cf_c \quad (2)$$

Equation (3):

$$B = 1/\tau_p \quad (3)$$

Equation (4):

$$L = L_t L_r L_{other} \quad (4)$$

The cross section is then derived from the beam width ($\beta$) using Equation (5).

Equation (5):

$$\sigma = \pi^*(R^*\text{Tan}(\beta/2))^2 \quad (5)$$

Equation 6 defines a modified SNR Radar Imaging Function of Equation (1) in each grid location (see FIGS. 11A-11D) with reflected power delay to radar indicating the depth information. For simplicity UWB wave travelling time in ground has been assumed to be twice that in air. Additionally, the SNR has been averaged over 4 nearest neighboring cells that received reflected power.

Equation (6):

$$SNR = \sum_{i=1}^{m} \frac{P_T \cdot G_T \cdot G_R \cdot \lambda^2 \cdot (\text{Tan}(\beta/2)^2}{4(4\pi R_i)^2 \cdot kT_0 \cdot F_n \cdot L} \cdot \tau_p \quad (6)$$

Figure 5:
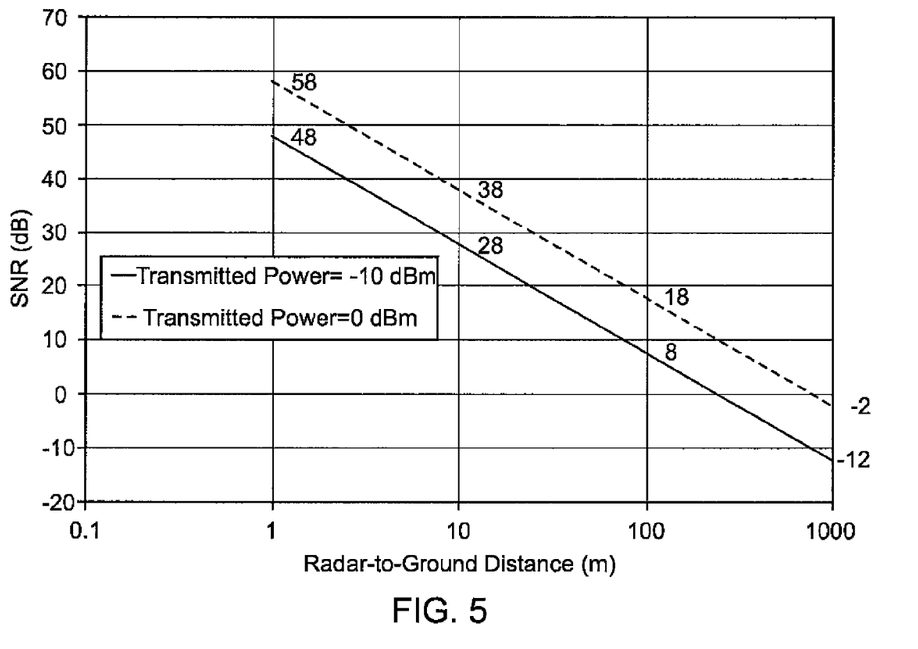
FIG. 5 is a graph illustrating signal to noise ratio (SNR) as a function of distance from the ground of a radar receiver, in accordance with an embodiment.

FIG. 5 is a graph illustrating signal to noise ratio (SNR) as a function of distance in air from the ground of a radar receiver, in accordance with an embodiment. FIG. 5 demonstrates the signal-to-noise ratio for two scenarios of 0 dBm (decibels normalized to milliwatts (m or mW)) and −10 dBm transmitted power, as indicated by the legends on FIG. 5. The antenna gain was measured to be 12 dBi (decibels relative to an isotropic antenna), center frequency of 5 GHz and bandwidth of 2 GHz, room temperature operation (generally taken as about 293 degrees Kelvin) with the receiver with 6 dB of noise factor and 8 dB of loss in its transmitter circuitry.

Figure 6:
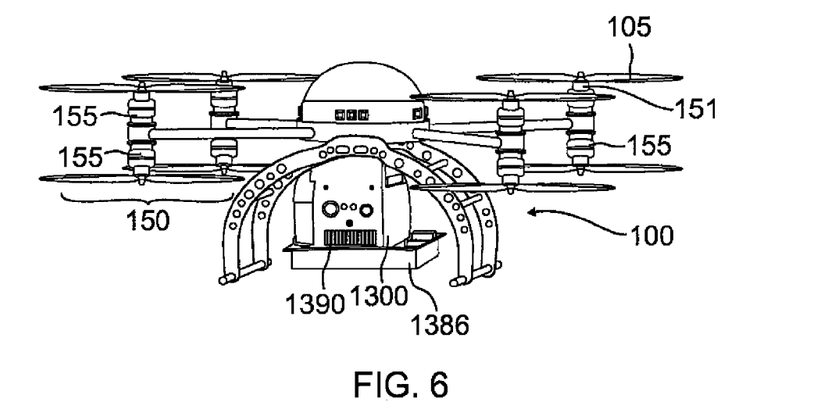
FIG. 6 is a perspective view illustrating a vertical take off and landing (VTOL) small unmanned aerial system (sUAS) carrying a radar sensor, in accordance with an embodiment.

FIG. 6 illustrates a vertical take off and landing (VTOL) small unmanned aerial system (sUAS) aircraft 100 carrying a radar sensor 1300, in accordance with an embodiment. Aircraft 100 may also include a payload delivery system 1386 for delivering a payload (e.g., an object or an electric discharge or spark) to, for example, a buried IED detected by UWB radar scanning (using radar sensor 1300) of a suspect area. Aircraft 100 may also include an explosive discoloration agent spray system 1390 for spraying an interrogated (e.g., scanned using radar sensor 1300 or optical camera or thermal imaging cameras 137, see FIG. 7A) portion of a suspect area with explosive discoloration agent to verify the presence of a buried IED. Aircraft 100 may also by augmented by attaching guards (not shown) around the propellers for safe and quiet surveys.

Aircraft 100 may include a VTOL capability as an sUAS with its radar sensor 1300 that may operate as an ultra-wideband (UWB) radio frequency (RF) radar that has the capability to perform autonomous take-off and landing. As a dual function radar that operates in the license free band of 3-6 GHz, the UWB RF sensor 1300 may also be used, for example, as a motion detector and tracking system for surveillance of live objects inside a compound. The UWB RF sensor 1300 may emit rapid wideband pulses (e.g., sub nanosecond pulse width) that can penetrate glass, wood, concrete, dry wall and bricks. In the receiver (e.g., receiver 1370), a detector circuit may be employed to identify the reflections 1303 of transmitted pulses 1301 (e.g., pulses 1356, 1366). The received periodic pulses may be manipulated to enhance SNR while maintaining very low transmission power. Advanced signal processing algorithms may be employed to construct the activity detection of the target (e.g., target 1305). By using a laptop or game module (e.g., display 163, 165) the remotely guided mini-UAV (e.g., aircraft 100) can use the radar capability to land in a stationary position and scan the compound for detection of live objects, e.g., animals or people. While in motion or in stationary detection mode, aircraft 100 may process the data it collects and display the activity level in real-time. Aircraft 100 may have the capability of being configured to scan in the horizontal as well as in the vertical axis and may be capable of performing remote surveillance of premises at extended standoffs from a remote operator of sUAS aircraft 100. The system can be used, for example, to map inside walls of a compound for constructing a 2-D image of the building.

FIG. 6 illustrates aircraft 100 in a hovering mode. A radar mode operation in real-time may transmits a surveillance signal remotely to a controlling station at an extended range away from sUAS aircraft 100. The reflected signal from its radar transmitter (e.g., transmitter 1302, 1350, or 1360) may be an indicator that has been calibrated to show the relative elevation to the ground in this figure.

Figure 7A:
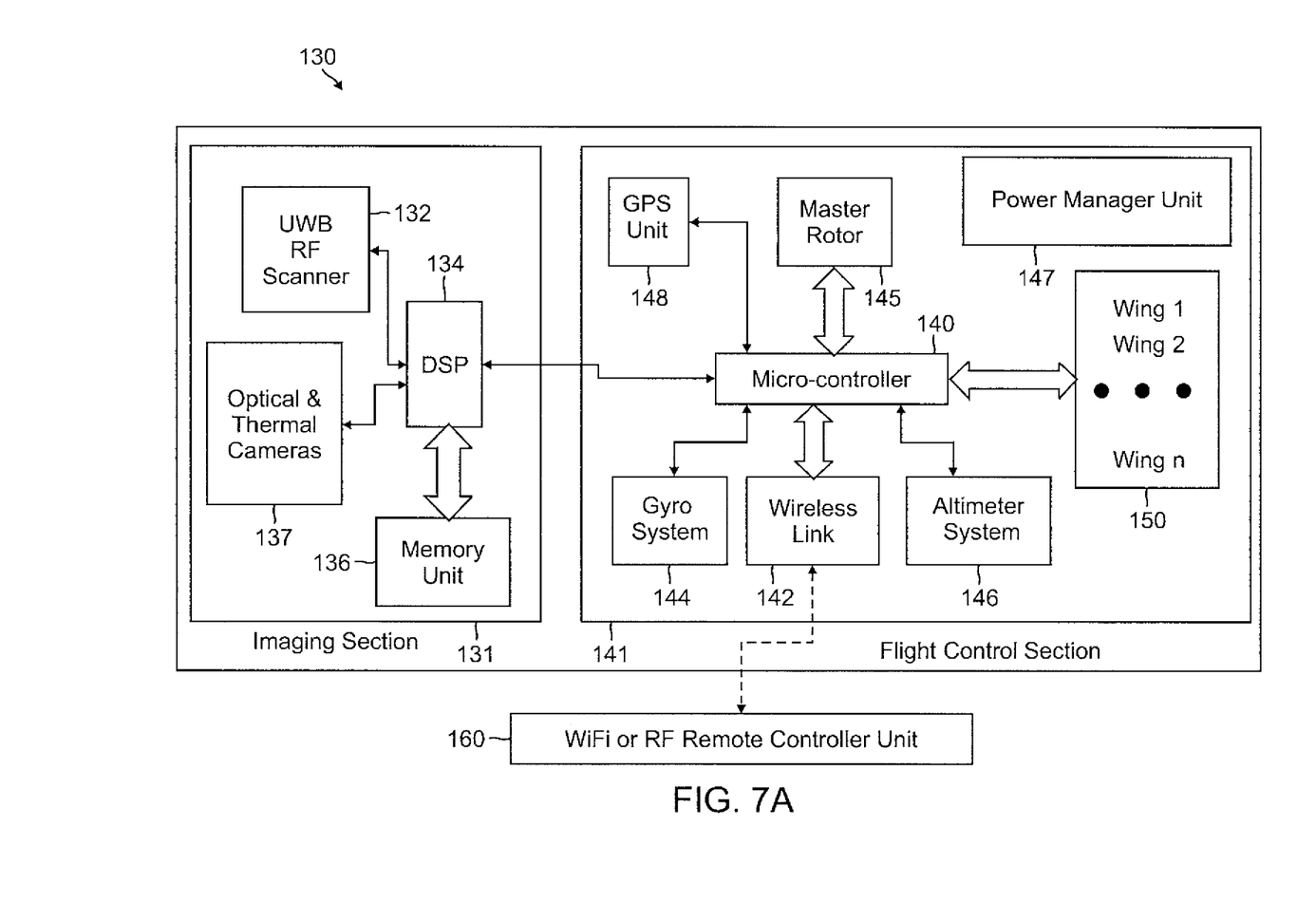
FIGS. 7A and 7B are system block diagrams illustrating a control and imaging system for an sUAS, such as shown in FIG. 6, in accordance with an embodiment.

The autonomous landing of the VTOL sUAS aircraft 100 in a pre-defined waypoint employs the capabilities provided by a GPS unit 148 (see FIG. 7A). The system aircraft 100 may fly to the pre-set GPS coordinates by using a combination of its GPS guidance system, a magnetometer for coarse guidance validation, and a gyro guidance system in cases that GPS information gets denied. Upon reaching the vicinity of the waypoint, the VTOL sUAS aircraft 100 may activate its UWB radar system 1300 and may hover or circle at a constant altitude around the selected suspect area (see FIGS. 11A, 11B).

Aircraft 100 may be remotely operated, for example, by a single specialist, such as Explosive Ordnance Disposal (EOD) personnel. Aircraft 100 may have a total diameter less than 30 inches (in.) and total flying weight, including batteries and UWB RF imager 1300 of less than 10.5 pounds (lb.). Aircraft 100 may have operational capability for vertical takeoff from any flat surface or surface sloped less than 45 degrees to a 100 ft. altitude in less than 10 seconds. Aircraft 100 may have operational capability for hover about 1.0 ft. above ground when locked to the GPS, e.g., using GPS unit 148. Aircraft 100 may have operational capability for sustained operation for at least 8.5 minutes, up to and possibly exceeding 30 minutes. Aircraft 100 may have operational capability for landing non-line-of-site (NLOS) using on-board radar capability.

As shown in FIG. 6, each wing propeller unit 155 of the plurality of wing propeller units 150 may include a wing unit propeller 105, a DC motor 151 and an ESC (not shown) for driving the motor. Each wing propeller unit 155 may include a local controller and a micro-electro mechanical (MEM) based gyro or accelerometer (not shown).

FIG. 7A illustrates one example of a system architecture for sensing, imaging, flight control, and telemetry system 130. Sensing, flight control, and telemetry system 130 may include an imaging section 131 and a flight control section 141, which may communicate wirelessly via a remote controller unit included in a control system 160. Wireless control system 160 may conform, for example, to any of the open standards or may be a proprietary control system. Wireless network connectivity may be provided by a wireless control system 160.

Imaging section 131 may include one or more UWB RF scanners (e.g., sensor array 132) such as, for example, the 5 GHz or 60 GHz systems referenced above. In addition, imaging section 131 includes an optical video camera 137. The UWB RF scanner (sensor array unit 132) and camera 137 may be connected to a digital signal processing (DSP) unit 134, which may access a memory unit 136 comprising, for example, a random access memory (RAM). The DSP unit 134 may communicate, as shown in FIG. 7A, with flight control section 141. The UWB RF scanners may scan the ground over a field of view that ranges from 1 to 150 degrees.

Flight control section 141 may include a micro-controller 140. Micro-controller 140 may integrate all sensory and control inputs from the components of flight control section 141 and may provide control and telemetry outputs for UAV 100. As shown in FIG. 7A, micro-controller 140 may receive inputs from wireless link 142, which may provide operator control inputs from an operator at a remote location using, for example, an encrypted WiFi, an encrypted cellular phone, or RF remote controller unit of wireless control system 160. Micro-controller 140 may receive additional control and stabilizing inputs, for example, from gyro system 144 and altimeter system 146. Micro-controller 140 may receive position or location data from GPS system 148. For example, inputs from GPS system 148 may enable UAV 100 to report its position via telemetry and to be monitored over Google® maps, for example, using GPS.

Micro-controller 140 may provide control outputs and receive feedback inputs from wing propeller units 150. As shown in FIG. 6, each wing propeller unit 155 of the plurality of wing propeller units 150 may include a wing unit propeller 105, a DC motor 151 and an ESC (not shown) for driving the motor. Each wing propeller unit 155 may include a local controller and a micro-electro mechanical (MEM) based gyro or accelerometer (not shown).

Flight control section 141 may also include a power manager unit 147 for providing and regulating electrical power to any of the systems of UAV 100.

Figure 7B:
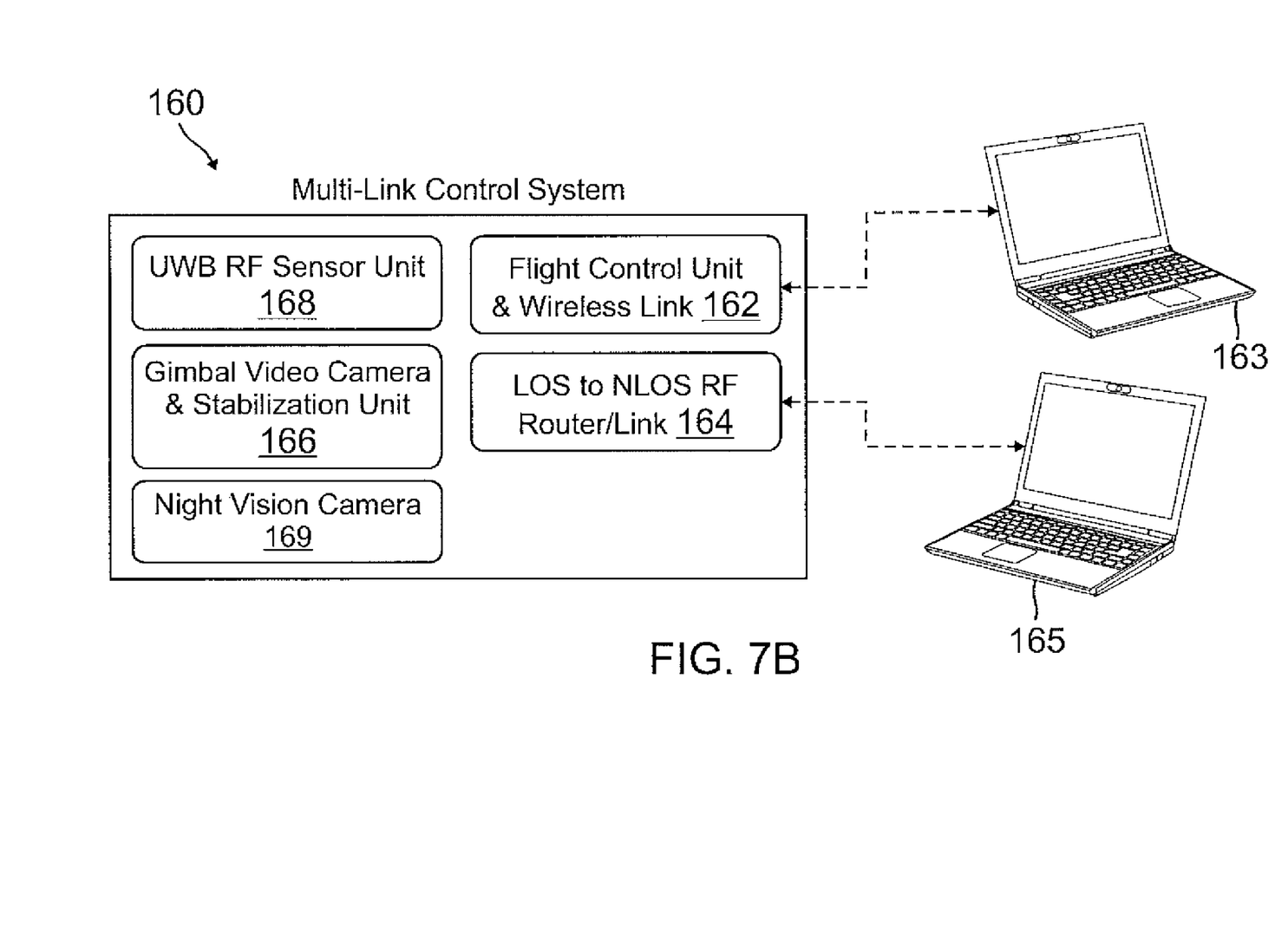

FIG. 7B illustrates one example of a multi-link wireless control system 160 for standoff surveillance system 100. Multi-link wireless control system 160 may include a system interface display (see FIG. 10) for providing surveillance information to a user from an RF imaging system or other surveillance systems (e.g., video, audio) on UAV 100. Control system 160 may provide a system interface for one or more operators using display and input devices to communicate with and control UAV 100 at a location remote from UAV 100. The remote controller may be, for example, a laptop, or a cellular phone or hand-held system, or a device that provides joy stick controls, for example, for the rate of rotation for each of propellers 105. For example, flight control may be provided by adjustment of the speed and thrust from all of the propeller units concurrently under direction of micro-controller 140, which may interpret signals from the joysticks to co-ordinate the adjustments.

Multi-link wireless control system 160 may provide links, as shown, for a UWB radar RF sensor unit 168, gimbal video camera and stabilization unit 166, night vision camera 169, flight control unit 162, and line-of-sight (LOS) to non-line-of-sight (NLOS) router link 164. Each of these units may, for example, process telemetry data or interface control inputs to a corresponding unit on UAV 100. Interface display 163, for example, may provide first person view (FPV) control and direct visual flight control for UAV 100 as well as display telemetry data such as RF imaging from the UWB radar sensors on board the UAV 100. Interface display 165 may provide an LOS to NLOS router link for UAV 100.

Figure 8A:
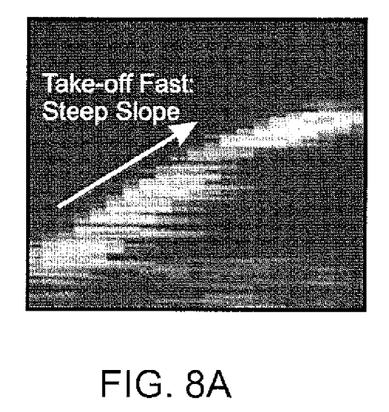
FIGS. 8A and 8B are display images showing sensor images from an sUAS for a sample take-off and a sample landing, in accordance with an embodiment.
Figure 8B:
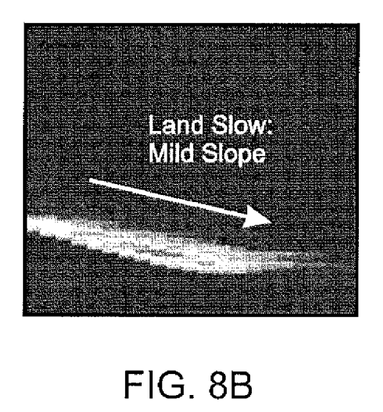

FIGS. 8A and 8B are display images showing sensor images from an sUAS for a sample take-off and a sample landing, in accordance with an embodiment. FIGS. 8A and 8B show reflected output waveforms from the UWB radar imaging system (e.g., imaging system 131 displayed on remote unit 163 or 165). FIGS. 8A and 8B show a monotonic time scale (on the horizontal or x-axis) so that the slope of the curve formed by successive radar images can indicate speed of take-off (FIG. 8A) and landing (FIG. 8B). As can be seen, FIG. 8A demonstrates a relatively fast take-off inferred from the relatively steep slope of successive radar images, while FIG. 8B demonstrates a relatively slow landing inferred from the relatively less steep slope of successive radar images.

Figure 9A:
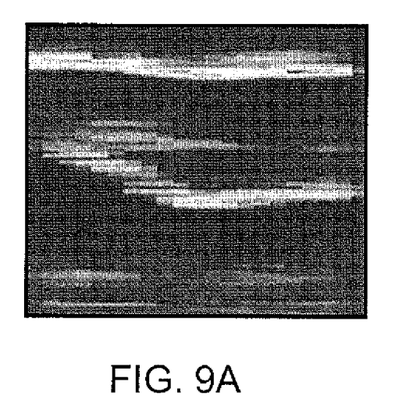
FIGS. 9A and 9B are display images showing sensor images from an sUAS for determining an appropriate landing location, in accordance with an embodiment.
Figure 9B:
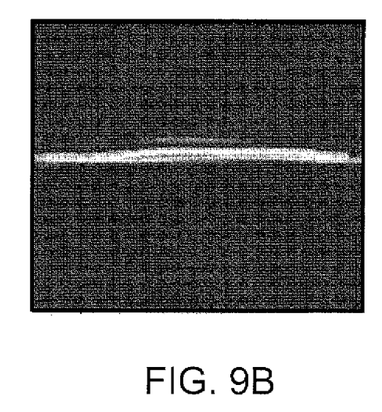

FIGS. 9A and 9B are display images showing sensor images from an sUAS for determining an appropriate landing location, in accordance with an embodiment. The images demonstrate information gathered by the UWB radar imaging system 131 that may be used by a method for autonomous landing of aircraft 100.

In FIG. 9A, for example, while background reflections are eliminated, the radar system 131 continues to observe the reflections and upon finding multiple reflections, the control system 141 may decide that the platform (e.g., landing site being considered) is not a suitable one. In FIG. 9B, for example, as soon as a single reflection dominates the radar receiver of radar imaging system 131, a continuous hovering around the reference point (background eliminated point) may enable decision making to land on a flat platform.

Figure 10:
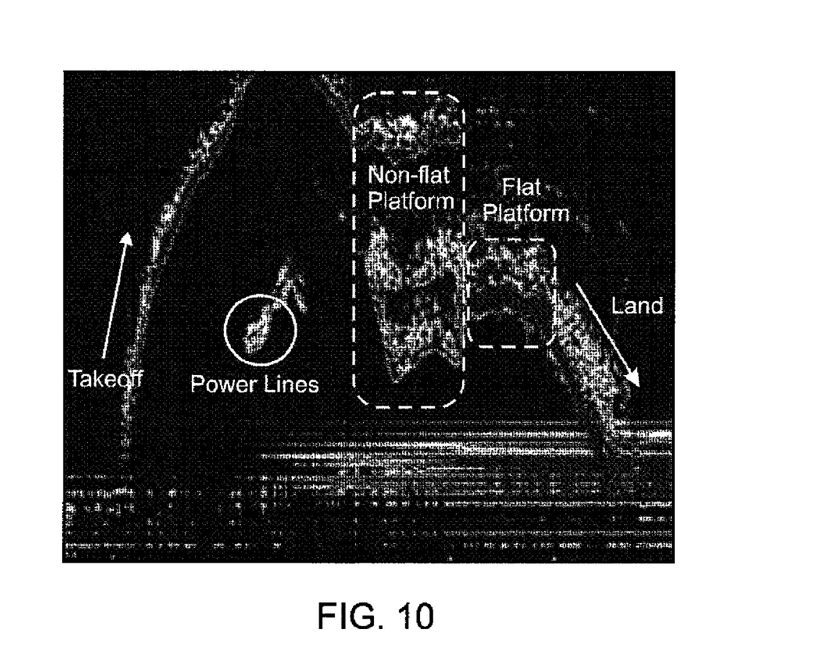
FIG. 10 is a display image showing sensor images from an sUAS from a landing pattern, such as shown in FIG. 11A or FIG. 11B, in accordance with an embodiment.
Figure 11A:
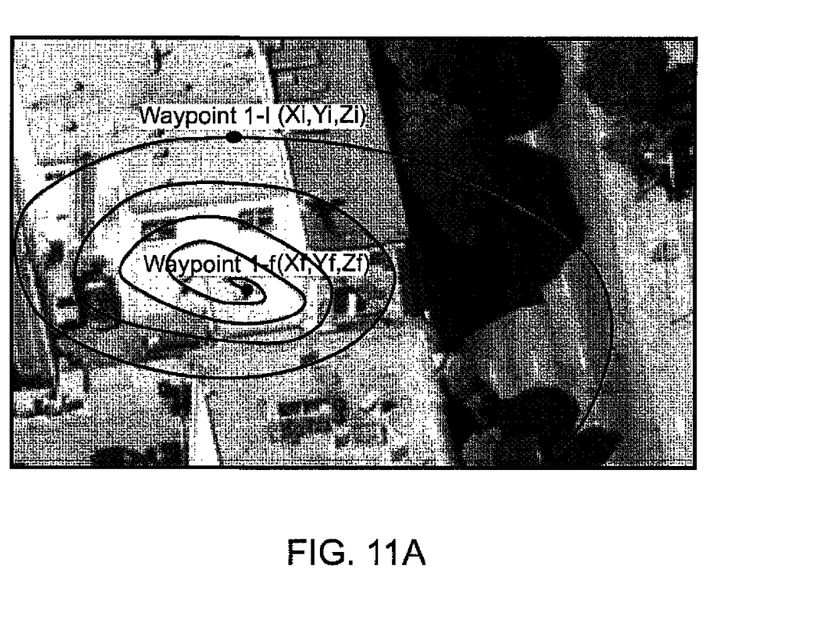
FIGS. 11A and 11B are perspective views of landing patterns conducted by an sUAS, such as the sUAS shown in FIG. 6, in accordance with an embodiment.
Figure 11B:
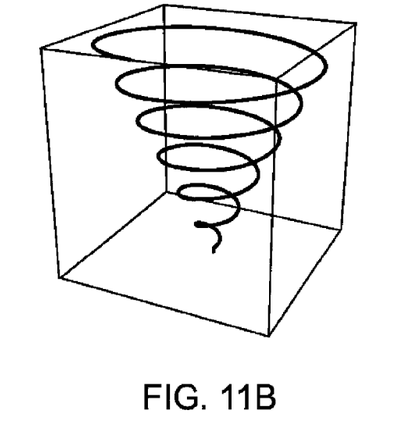

FIG. 10 is a display image showing sensor images from an sUAS from a landing pattern, such as shown in FIG. 11A or FIG. 11B, in accordance with an embodiment. FIG. 10 shows a relationship between the altitude of aircraft 100 and the beam width (dependent on size of the passive or active array) of UWB radar imaging system 131. It may be important that hovering covers enough area (e.g. that the landing pattern enables radar imaging system 131 to interrogate enough of the selected area) to find a platform that is safe for landing.

An autonomous radar scan of the selected area, using a spiral pattern as shown in FIG. 11A or FIG. 11B may be implemented automatically using aircraft 100 with differential GPS (DGPS) accuracy. The autonomous scan may robustly provide a three-dimensional (3-D) spatial image of the selected area. Guiding of a pre-defined pattern, such as a spiral pattern for the autonomous landing pattern may employ incremental GPS waypoints provided by GPS system 148.

FIGS. 11A and 11B are perspective views of landing patterns conducted by an sUAS, such as the sUAS shown in FIG. 6, in accordance with an embodiment. FIGS. 11A and 11B illustrate a near logarithmic or equiangular helical-spiral pattern of autonomous landing in three dimensions. The landing process may follow the logarithmic helical-spiral described by Equations 7-9, for example, and method 1400 illustrated in FIG. 14.

The autonomous landing pattern of the VTOL aircraft 100 may begin at a pre-defined waypoint, which may be found using on-board GPS system 148 (see FIG. 7A). The aircraft 100 may fly to the pre-set GPS coordinates, for example, by using a combination of its GPS guidance system 148, a magnetometer for coarse guidance validation, and a gyro guidance system 144 in cases that GPS information gets denied.

Upon reaching the vicinity of the initial pre-defined waypoint, the VTOL UAV aircraft 100 may activates its UWB radar system 131 and hover at a constant altitude around a circular perimeter of pre-defined radius. Sensing, flight control, and telemetry system 130 of aircraft 100 may then calculate the least detected energy region as shown in FIG. 9B.

System 130 may repeat its assessment of the reflected energy and estimate the altitude of the single reflection. Comparing that to its preprogrammed altitude, system 130 may then decide to land in the center of the surveyed pattern that aircraft 100 has been circling (e.g., by hovering at a constant altitude around the circular perimeter of pre-defined radius).

Figure 12A:
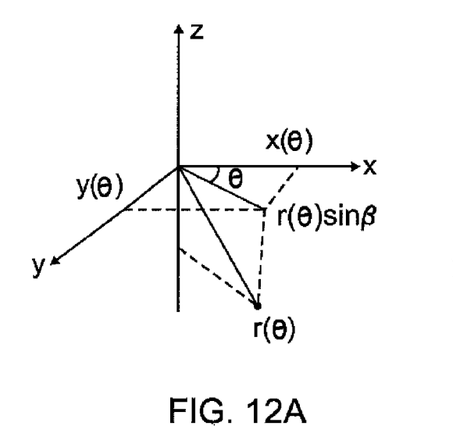
FIGS. 12A and 12B are an x-y-z coordinate system illustrating an example of navigation for landing patterns, such as shown in FIGS. 11A and 11B, in accordance with an embodiment.
Figure 12B:
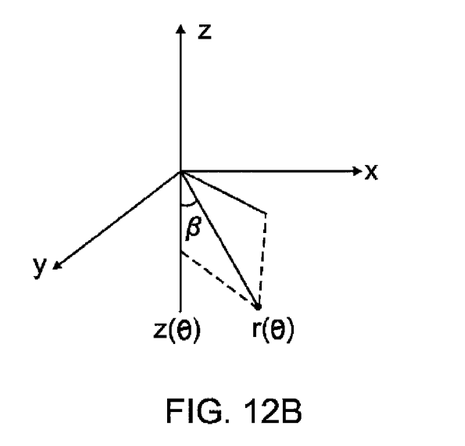
Figure 14:
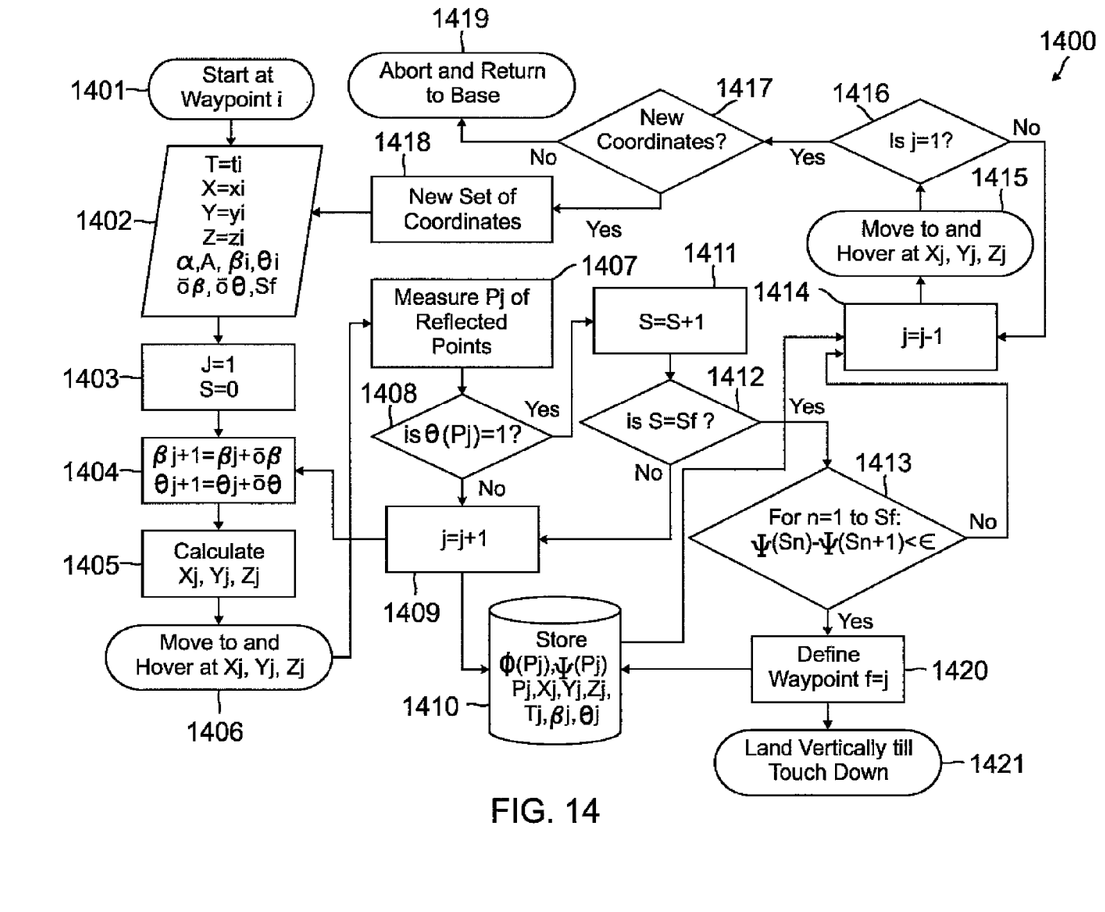
FIG. 14 is a flow chart illustrating a method for autonomous aircraft landing, in accordance with an embodiment.

FIGS. 12A and 12B are an x-y-z coordinate system illustrating an example of navigation for landing patterns, such as shown in FIGS. 11A and 11B, in accordance with an embodiment. Equations 7, 8, and 9 provide a mathematical description for flying a spiral pattern as illustrated by FIG. 12A and FIG. 12B:

$$X(\beta, \theta) = A \cdot \sin \beta \cdot \cos \theta \cdot e^{-\theta \cot \alpha} \quad (7)$$

$$Y(\beta, \theta) = A \cdot \sin \beta \cdot \sin \Theta \cdot e^{-\theta \cot \alpha} \quad (8)$$

$$Z(\beta, \theta) = -A \cdot \cos \beta \cdot e^{-\theta \cot \alpha} \quad (9)$$

where:
α=equiangular angle of spiral H;
θ=hovering angle around Z-axis;
β=angle between Z-axis and line from aperture local origin to XYZ origin; and
A=size of the spiral aperture (distance from main origin of aperture at=0). A may be, for example, a constant value of $Z_0$ with θ and β equal to zero. It may be the initial value of Z where the down spiral landing begins to be performed. In FIGS. 12A and 12B, r(θ) may be $R_0$, the initial waypoint that the VTOL aircraft 100 starts the landing process as described by method 1400 illustrated by FIG. 14.

Figure 13A:
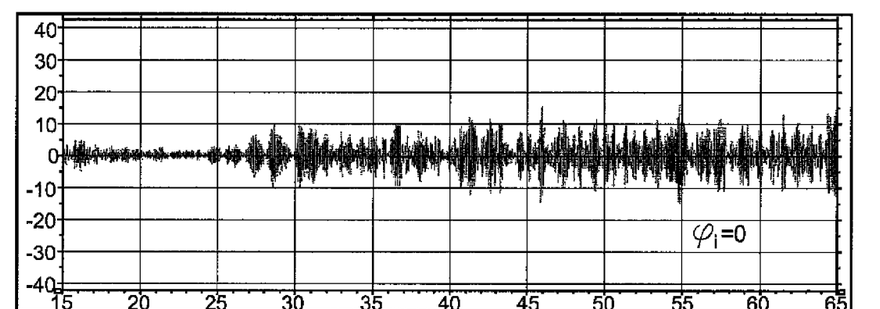
FIGS. 13A, 13B, and 13C are a set of three graphs illustrating examples of reflected power patterns for signal processing for a search pattern, in accordance with an embodiment.
Figure 13B:
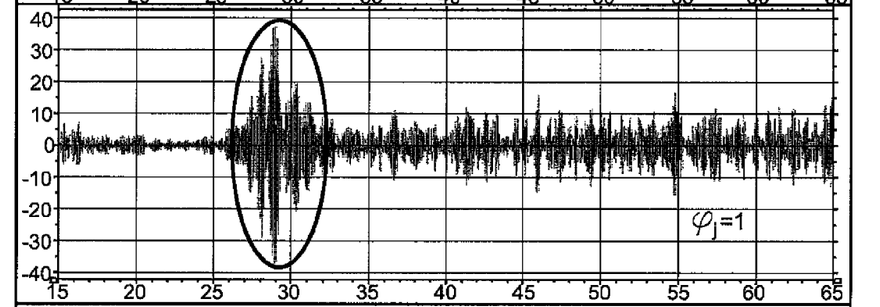
Figure 13C:
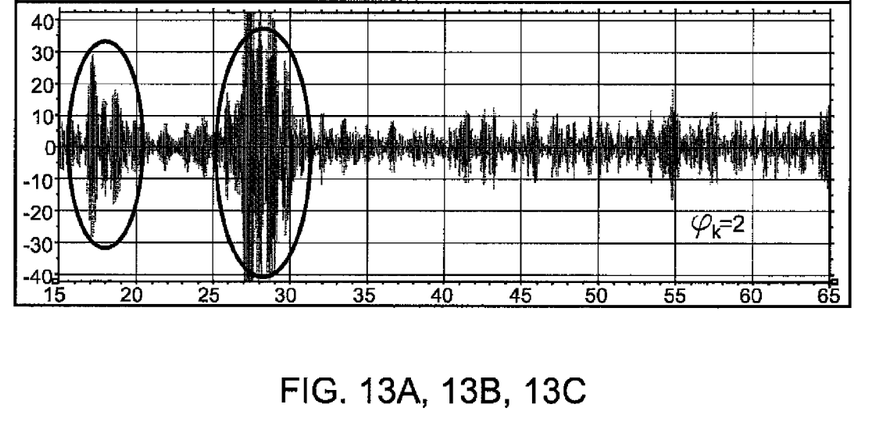

Based on the above spiral pattern, a method 1400, illustrated by FIG. 14, may be followed to autonomously land the VTOL UAV aircraft 100. Based on Equations 7-9, incremental descent in a logarithmic helical-spiral pattern may proceeds according to method 1400. The coordinates and timing of each incremental hovering point may be recorded. At each hovering point (j), the UWB radar imaging system 131 may provide the reflected power (Pj) pattern at the radar's receiver 1304. This pattern may be stored and referred to as "bin". FIGS. 13A, 13B, and 13C depict examples of the reflected pattern obtained from the UWB radar 1300.

FIGS. 13A, 13B, and 13C are a set of three graphs illustrating examples of reflected power patterns for signal processing for an autonomous landing pattern, in accordance with an embodiment.

The coordinates and timing of each incremental waypoint may already be programmed in the VTOL sUAS aircraft 100 prior to launch. Travelling at a pre-defined altitude through each waypoint (j), the UWB radar (e.g., radar sensor 1300, UWB RF scanner 132) may scan the reflected power (Pj) pattern at the radar's receiver (e.g., radar receiver 1304, 1370). The reflected power (Pj) pattern may be stored in what is referred to as a "bin" file. FIGS. 13A, 13B, and 13C depict samples of reflected patterns obtained from the UWB radar sensor 1300.

While the content of the reflected power ($\Psi(Pj)$) is stored in a bin file, a mathematical filtering may be performed to identify spatial position ($\phi(Pj)$) of the reflections. The filtering function φp(Pj) may identify a number of cluttering elements within the beam width range of the UWB's antenna system 1325. Based on that analysis and gathering more samples (S), the system 130 may decide that the points inside a platform are indicating a flat or sloped surface and may decide whether there is suitability to ensure a low risk landing. So, for example, as shown in FIG. 13A, zero reflected elements are identified and $\phi_i = \phi(Pi) = 0$. As shown in FIG. 13B, φ(Pj) or $\phi_j = 1$, identifying one reflected element, and in FIG. 13C, $\phi_k = 2$, identifying two reflected elements. The data is then processed by the UWB radar imaging process illustrated in FIG. 9 through FIG. 12 and FIG. 13 to depict the 3-D image of the detected objects underground as shown in FIG. 12.

FIGS. 13A, 13B, and 13C demonstrate three examples of collected bins at i, j, and k positions. The bin files are processed to identify the number of the major peaks above the system noise level. As it can be seen, φ(Pi)=0, φ(Pj)=1, and φ(Pk)=2. The ideal positions are at φ(P)=1 where only one peak is detected and the sequential detection of all φ(Ps)=1, for S=1 to S=Sf, also corresponds to same heights H(s). In practice S 3 is in general sufficient for finding a suitable landing site.

Based on the H(s), the processor inside the UWB radar (e.g., processor of system 130 such as micro-controller 140 shown in FIG. 7A) may calculate the slope of the landing platform and decide to land or abort depending whether the slope of the landing platform is steeper than the landing capability of the VTOL sUAS aircraft 100. Upon landing, the radar system (e.g., radar imaging system 131) may change its mode, for example, from "scan" to "motion detection".

FIG. 14 is a flow chart illustrating a method 1400 for autonomous aircraft landing, as illustrated by FIGS. 8-13. At step 1401, method 1400 may fly aircraft 100 to an initial incremental waypoint such as waypoint(1) shown in FIG. 11A. Aircraft 100 may fly autonomously, for example, to the initial pre-programmed waypoint or may fly under the direction of a remote operator using multi-link control system 160.

At step 1402, various variables may be initialized, such as T, the time (e.g., universal time stamp) that waypoint(i) is scanned; X, Y, Z, x-y-z coordinates of waypoint(i); the variables from Equations 7-9; delta increment values indicating change from the previous aircraft position to the current aircraft 100 position; and Sf described above with reference to FIGS. 13A, 13B, and 13C.

At step 1403, J, the current value of the waypoint index i; and S (sample number) may be initialized. At step 1404, the angles for Equations 7-9 may be updated using the delta increment values reflected in aircraft 100 proceeding from its current position to its next position. At step 1405, system 130 may calculate the X, Y, Z, x-y-z coordinates of its next position so that at step 1406, aircraft 100 may move to and hover at the new X, Y, Z values of the x-y-z coordinates.

At step 1407, the UWB radar imaging system (e.g., imaging section 131) may identify spatial position ($\phi(Pj)$) and measure reflected power ($\Psi(Pj)$) for Pj and may store ($\phi(Pj)$), ($\Psi(Pj)$), Pj, Xj, Yj, Zj, and Tj in a bin file upon reaching step 1410.

At step 1408, system 130 may determine whether (Pj)=1, indicating that a flat or suitable platform may have been found. If yes, the method proceeds to step 1411, incrementing S, and then to 1412, checking if S=Sf (as described above with reference to FIGS. 13A, 13B, and 13C).

If at step 1408, or at step 1412, either check returns "No", J, the current value of the waypoint index i; is incremented at step 1409, data is stored at step 1410 in a bin file as described above, and method 1400 proceeds again from step 1404.

If at step 1412, S=Sf, method 1400 proceeds to step 1413, comparing adjacent sample values of ($\Psi(Pj)$) as to whether they are closer together than a pre-determined amount $\epsilon$, and if so proceeds to step 1420, where a waypoint is defined, data is stored at step 1410 and aircraft 100 may descend vertically until a landing is achieved at step 1421.

If instead, at step 1413, two adjacent sample values of ($\Psi(Pj)$) are not closer together than a pre-determined amount $\epsilon$, method 1400 proceeds to step 1414, where J, the current value of the waypoint index i; is decremented, and at step 1415, aircraft 100 may move to and hover at the new X, Y, Z values of the x-y-z coordinates. If at step 1416, J is not equal to 1, method 1400 loops back to step 1414 until J becomes 1 at step 1416, proceeds to step 1417, checking for new coordinates. If there are new coordinates (step 1418) method 1400 returns to step 1402, and if not method 1400 proceeds to step 1419, at which aircraft 100 may abort its mission and may fly autonomously, for example, to a pre-programmed home waypoint or may fly under the direction of a remote operator using multi-link control system 160 home or on to the next mission.

After landing the UWB radar system 130 may be enabled for discriminating living individuals from inanimate objects and detecting whether an individual may be carrying an object of interest such as a concealed weapon or an improvised explosive device (IED). Such capability may be useful in situations where surveillance of an inhabitable area from the roof—such as a building and compounds—is desired. Some examples include detecting illegal activities such as smuggling or illegal border crossings under a warehouse, and detecting the presence of hostile individuals in a war zone or terrorist situation. In some situations, e.g., police work, military combat scenarios, fire and rescue situations, or border and immigration control, it may be desirable to be able to detect living individuals by deploying the UWB radar system 130 from outside any kind of structure occupied by the individuals, for example, a building or a temporary shelter. Such multi-purpose, multi-function radar carried by aircraft 100 can be landed autonomously and address the compound occupancy.

Embodiments described herein illustrate but do not limit the disclosure. It should also be understood that numerous modifications and variations are possible in accordance with the principles of the present disclosure. Accordingly, the scope of the disclosure is best defined only by the following claims.

What is claimed is:

1. A system comprising:
   an aircraft having a plurality of wing unit propellers for vertical takeoff and landing;
   a control system included in the aircraft for controlling flight of the aircraft autonomously and receiving additional control inputs from an operator at a remote location;
   an ultra-wideband (UWB) radar imaging system, wherein the UWB radar imaging system is carried by the aircraft; and wherein:
   the control system is configured to perform an autonomous landing pattern by autonomously flying the aircraft, guided by a pre-defined pattern, over a selected area while the UWB radar imaging system gathers information from the selected area;
   the control system is configured to decide, based on whether multiple reflections are observed by the UWB radar imaging system, as indicated by adjacent sample values of reflected power not being closer together than a pre-determined amount, or a single reflection, as indicated by adjacent sample values of reflected power being closer together than the pre-determined amount, dominates the observation of the UWB radar imaging system, whether a platform is suitable for landing; and
   a telemetry system carried by the aircraft for providing information from the UWB radar imaging system to the remote location for surveillance of the selected area.

2. The system of claim 1, further comprising:
   a global positioning system (GPS) unit carried by the aircraft; and wherein
   the system determines a start point for autonomously flying the autonomous landing pattern from a global positioning system (GPS) waypoint.

3. The system of claim 1, further comprising:
   a global positioning system (GPS) unit carried by the aircraft; and wherein
   the pre-defined pattern of the autonomous landing pattern is a spiral pattern implemented automatically using differential GPS.

4. The system of claim 1, wherein the pre-defined pattern further comprises:
   coordinates and timing of a plurality of incremental waypoints (waypoint(j)) that are programmed in the system prior to flight of the aircraft; and
   the information gathered from the selected area by the the UWB radar imaging system includes:
   a reflected power, Pj, for each incremental waypoint(j) scanned by the UWB radar imaging system as the aircraft travels through each incremental waypoint(j);
   a pattern of reflected power from a plurality of Pj stored in a bin ($\psi(Pj)$); and
   a number of reflected elements within a beam width antenna range of the UWB radar imaging system determined by a mathematical filtering of the bin ($\psi(Pj)$) performed to identify a spatial position ($\phi(Pj)$) of the reflected elements.

5. The system of claim 1, further comprising:
   an optical or infrared camera carried by the aircraft, wherein:
   the telemetry system provides information from the optical or infrared camera to the remote location.

6. The system of claim 1, wherein the ultra-wideband (UWB) radar imaging system includes a wafer scale beam forming antenna array wherein the maximum dimension of the antenna array is less than 5 inches.

7. The system of claim 1, wherein:
the control system is a multi-link control system;
the multi-link control system includes a communication link for streaming optical, thermal, or radar processed images from a scanned portion of the selected area.

8. A method comprising:
controlling, autonomously and additionally by receiving control inputs from an operator at a remote location, an aircraft having a plurality of wing unit propellers for vertical takeoff and landing;
operating an ultra-wideband (UWB) radar imaging system for gathering information from a selected area, wherein the UWB radar imaging system is carried by the aircraft; and
performing an autonomous landing pattern, by the aircraft, by autonomously flying the aircraft, guided by a pre-defined pattern, over the selected area and gathering information from the selected area with the UWB radar imaging system;
comparing at least one pair of adjacent sample values of reflected power to determine if the values are closer together than a pre-determined amount;
deciding, based on whether multiple reflections are observed by the UWB radar imaging system, as indicated by the compared adjacent sample values of reflected power not being closer together than the pre-determined amount, or a single reflection, as indicated by the compared adjacent sample values of reflected power being closer together than the pre-determined amount, dominates the observation of the UWB radar imaging system, whether a platform is suitable for landing; and
providing information from the UWB radar imaging system to the remote location, using a telemetry system carried by the aircraft.

9. The method of claim 8, further comprising:
determining a start point for autonomously flying the autonomous landing pattern from a global positioning system (GPS) waypoint, wherein a GPS unit carried by the aircraft is used for determining the aircraft position.

10. The method of claim 8, wherein performing the autonomous landing pattern further comprises:
flying the autonomous landing pattern in a spiral pattern implemented automatically using differential GPS, wherein a GPS unit carried by the aircraft is used for determining the aircraft position.

11. The method of claim 8, further comprising:
programming coordinates and timing of a plurality of incremental waypoints (waypoint(j)) in the system prior to flight of the aircraft;
scanning by the UWB radar imaging system as the aircraft travels through each incremental waypoint(j) a reflected power, Pj, for each incremental waypoint(j);
storing a pattern of reflected power from a plurality of Pj in a bin ($\psi(Pj)$); and
determining a number of reflected elements within a beam width antenna range of the UWB radar imaging system by a mathematical filtering of the bin ($\psi(Pj)$) performed to identify a spatial position ($\phi(Pj)$) of the reflected elements.

12. The method of claim 8, further comprising:
providing information from an optical or infrared camera carried by the aircraft to the remote location using the telemetry system.

13. The method of claim 8, further comprising:
forming a UWB radar beam, by the UWB radar imaging system, using a wafer scale beam forming antenna array wherein the maximum dimension of the antenna array is less than 5 inches.

14. The method of claim 8, further comprising:
streaming optical, thermal, or radar processed images from a scanned portion of the selected area using a communication link of a multi-link control system between the aircraft and the remote location.

* * * * *